United States Patent
Zeng

(10) Patent No.: US 10,572,335 B2
(45) Date of Patent: Feb. 25, 2020

(54) METADATA RECOVERY METHOD AND APPARATUS

(71) Applicant: Huawei Technologies Co., Ltd., Shenzhen (CN)

(72) Inventor: Yu Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 120 days.

(21) Appl. No.: 15/928,330

(22) Filed: Mar. 22, 2018

(65) Prior Publication Data

US 2018/0210784 A1     Jul. 26, 2018

Related U.S. Application Data

(63) Continuation of application No. PCT/CN2016/111331, filed on Dec. 21, 2016.

(30) Foreign Application Priority Data

Feb. 26, 2016  (CN) .......................... 2016 1 0107365

(51) Int. Cl.
*G06F 11/07*  (2006.01)
*G06F 16/23*  (2019.01)
(Continued)

(52) U.S. Cl.
CPC ........ *G06F 11/0793* (2013.01); *G06F 11/073* (2013.01); *G06F 11/0751* (2013.01);
(Continued)

(58) Field of Classification Search
CPC ............... G06F 11/073; G06F 11/0751; G06F 11/0793; G06F 12/10; G06F 16/2365;
(Continued)

(56) References Cited

U.S. PATENT DOCUMENTS 5,675,767 A   10/1997 Baird et al.
8,554,741 B1  10/2013 Malina
(Continued)

FOREIGN PATENT DOCUMENTS

CN    102662795 A    9/2012
CN    103019626 A    4/2013
(Continued)

*Primary Examiner* — Guy J Lamarre
(74) *Attorney, Agent, or Firm* — Slater Matsil, LLP

(57) ABSTRACT

Embodiments of the present invention relate to the data storage field, and provide a metadata recovery method and apparatus that are applied to a storage array. The method includes: when first mapping data is intact and second mapping data is corrupted, reading each second logical block in a granularity of a size of a third logical block; obtaining logical address blocks LBA stored in granular data, to obtain an LBA range corresponding to each segment of granular data; determining, by using a correspondence between LBA ranges and identifiers of third logical blocks, an identifier of a third logical block corresponding to the LBA range of each segment of granular data; and generating, when metadata that includes the determined identifier of the third logical block does not exist in the second mapping data, metadata that includes the identifier of the third logical block.

18 Claims, 8 Drawing Sheets

(51) Int. Cl.
*G06F 11/14* (2006.01)
*G06F 12/1036* (2016.01)
*G06F 12/10* (2016.01)

(52) U.S. Cl.
CPC ...... *G06F 11/1402* (2013.01); *G06F 11/1435* (2013.01); *G06F 12/10* (2013.01); *G06F 12/1036* (2013.01); *G06F 16/2365* (2019.01); *G06F 2212/1032* (2013.01); *G06F 2212/657* (2013.01)

(58) Field of Classification Search
CPC .......... G06F 2212/657; G06F 12/1036; G06F 11/1402; G06F 11/1435; G06F 2212/1032
See application file for complete search history.

(56) References Cited

U.S. PATENT DOCUMENTS

| | | | |
|---|---|---|---|
| 2010/0141798 A1* | 6/2010 | Steinberg | G06K 9/346 348/234 |
| 2010/0235565 A1 | 9/2010 | Ton-That et al. | |
| 2013/0262747 A1* | 10/2013 | Chang | G06F 11/1443 711/103 |
| 2015/0100719 A1 | 4/2015 | Lin et al. | |
| 2015/0378948 A1* | 12/2015 | Parikh | G06F 13/1694 710/308 |
| 2016/0110249 A1* | 4/2016 | Orme | G06F 12/0238 714/6.24 |
| 2016/0179609 A1 | 6/2016 | Zhou et al. | |
| 2017/0091115 A1 | 3/2017 | Xiao et al. | |
| 2017/0344474 A1 | 11/2017 | Zhou et al. | |

FOREIGN PATENT DOCUMENTS

| | | |
|---|---|---|
| CN | 103136370 A | 6/2013 |
| CN | 103544995 A | 1/2014 |
| CN | 103699457 A | 4/2014 |
| CN | 103902406 A | 7/2014 |
| CN | 104461391 A | 3/2015 |
| CN | 105224478 A | 1/2016 |
| CN | 105243025 A | 1/2016 |
| CN | 105808378 A | 7/2016 |

\* cited by examiner

METADATA RECOVERY METHOD AND APPARATUS

CROSS-REFERENCE TO RELATED APPLICATIONS

This application is a continuation of International Application No. PCT/CN2016/111331, filed on Dec. 21, 2016, which claims priority to Chinese Patent Application No. 201610107365.3, filed on Feb. 26, 2016. The disclosures of the aforementioned applications are hereby incorporated by reference in their entireties.

TECHNICAL FIELD

The present invention relates to the data storage field, and in particular, to a metadata recovery method and apparatus.

BACKGROUND

In a storage array, data stored in a logical unit number (LUN) may be divided into storage data and metadata. The storage data is data directly stored by a user, and the metadata is data used to manage and index the storage data. If metadata is corrupted, storage data corresponding to the metadata cannot be obtained.

When a LUN is used to store data, metadata in the LUN may be frequently corrupted. For example, corruption of the metadata may occur due to an incompliant operation on a storage device or a storage software problem, or any other scenario (such as random insertion of an array disk) that may cause metadata corruption. In order to avoid metadata corruption as far as possible, training for and standardization of operations on the storage device need to be strengthened to avoid incompliant operations wherever possible by compiling a detailed and accurate guidance document. Alternatively, the data in the LUN is protected and backed up by using some value-added service means, and when the metadata in the LUN is corrupted, the backup data may be used for recovery.

In avoidance of metadata corruption, incompliant operations cannot be completely avoided by strengthening training of people, and considerable communication costs are increased.

SUMMARY

To resolve a problem of a current system, embodiments of this application provide a metadata recovery method and apparatus. The technical solutions are as follows.

According to a first aspect, a metadata recovery method is provided, applied to a storage array. The storage array includes a first logical block. The first logical block includes multiple second logical blocks. Each second logical block includes multiple third logical blocks. A mapping relationship between the first logical block and the multiple second logical blocks is first mapping data. A mapping relationship between each second logical block and the multiple third logical blocks is second mapping data. The metadata recovery method includes, when the first mapping data is intact and the second mapping data is corrupted, reading data of each second logical block in a granularity of a size of the third logical block. The method also includes obtaining logical address blocks LBA stored in each segment of granular data, to obtain an LBA range corresponding to each segment of granular data. The method also includes determining, by using a correspondence between LBA ranges and identifiers of third logical blocks, an identifier of a third logical block corresponding to each segment of granular data. The method also includes generating, when metadata of the determined identifier of the third logical block does not exist in the second mapping data, metadata that includes the identifier of the third logical block. The second logical block includes multiple third logical blocks. Therefore, when the second logical block is read in the granularity of the third logical block, a segment of granular data that is read each time is data corresponding to a third logical block, and an LBA range in each segment of granular data may be determined according to LBAs stored in sectors of the granular data. The LBA range corresponds to the identifier of the third logical block corresponding to the segment of granular data. Therefore, when metadata that includes the identifier of the third logical block and that is in the second mapping data is corrupted, the metadata in the second mapping data may be recovered according to the obtained identifier of the third logical block. This resolves a technical problem in a current system that, in avoidance of metadata corruption, incompliant operations cannot be completely avoided by strengthening training of people and considerable communication costs are increased, and metadata recovery efficiency is improved.

With reference to the first aspect, in a first possible implementation of the first aspect, when the step of generating, when metadata that includes the determined identifier of the third logical block does not exist in the second mapping data, metadata that includes the identifier of the third logical block is implemented. An identifier of a second logical block that is read when the identifier of the third logical block is obtained is determined. An in-block offset of the third logical block in the second logical block is determined. A piece of metadata is formed by using the identifier of the third logical block, the identifier of the second logical block, and the in-block offset of the third logical block in the second logical block, so that corrupted metadata that is in the second mapping data and that includes the identifier of the third logical block is recovered.

With reference to the first aspect or the first possible implementation of the first aspect, in a second possible implementation, when the in-block offset of the third logical block in the second logical block is determined according to each third logical block included in the second logical block, when the third logical block is a $p^{th}$ third logical block in the second logical block, 1 is added to a sum of intervals occupied by p−1 third logical blocks preceding the third logical block, to obtain the in-block offset of the third logical block in the second logical block, where p>0. The second logical block includes multiple third logical blocks, and the sizes of the third logical blocks are the same. Therefore, when an in-block offset of a target third logical block in the second logical block needs to be determined, an order of the target third logical block in the second logical block is first determined, and the in-block offset of the target third logical block in the second logical block may be obtained according to an interval occupied by each third logical block before the order in the second logical block, so that the corresponding metadata is formed according to an identifier of the target third logical block, an identifier of the second logical block in which the target third logical block is located, and the in-block offset.

With reference to the first aspect, the first possible implementation of the first aspect, or the second possible implementation of the first aspect, in a third possible implementation, each time the granular data of the size of the third logical block is read, and when logical address blocks (LBA)

stored in the granular data are obtained to obtain the LBA range corresponding to each segment of granular data, an LBA that is stored at a predetermined location in each sector of the read granular data is recorded, and the LBAs in the sectors of each segment of granular data are combined to form the LBA range. All sectors are of a same size, and the LBAs are stored in identical locations in the sectors. Therefore, the LBA at the predetermined location in each sector can be accurately read. Further, the LBA uniquely corresponds to the identifier of the third logical block. Therefore, the identifier of the third logical block can be determined according to the corresponding LBA range of the size of the third logical block.

According to a second aspect, a metadata recovery apparatus is provided. The metadata recovery apparatus includes at least one unit. Each unit of the metadata recovery apparatus is configured to implement a corresponding step in the metadata recovery method in the foregoing first aspect.

According to a third aspect, a storage array is provided. The storage array includes a processor, and a memory, a network interface, and a hard disk that are connected to the processor. The processor is configured to implement the steps in the metadata recovery method in the foregoing first aspect.

According to a fourth aspect, a computer readable medium is provided. The computer readable medium stores an instruction used to implement the metadata recovery method provided in the first aspect.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 3B-1 and FIG. 3B-2 are a schematic diagram of metadata representing a mapping relationship in a LUN according to an example embodiment of the present invention;

DETAILED DESCRIPTION OF ILLUSTRATIVE EMBODIMENTS

To make the objectives, technical solutions, and advantages of the present invention clearer, the following further describes embodiments of the present invention with reference to the accompanying drawings.

A "module" mentioned in this specification is a program or an instruction that is stored in a memory and that can implement some functions. A "unit" mentioned in this specification is a functional structure obtained by means of logical division. The "unit" may be implemented by hardware only or implemented by a combination of software and hardware.

Figure 1A:
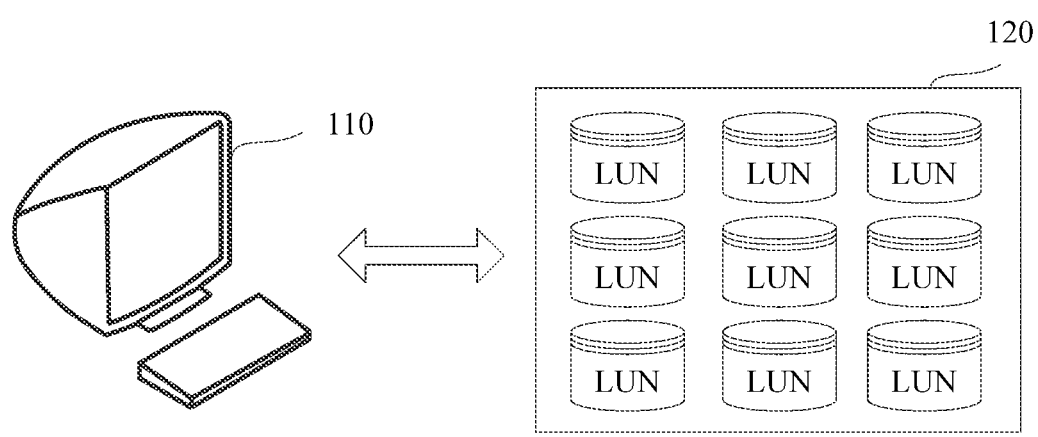
FIG. 1A is a schematic structural diagram of a storage system according to an example embodiment of the present invention.

Referring to FIG. 1A, FIG. 1A is a schematic structural diagram of a storage system according to an example embodiment of the present invention. The storage system includes a host no and a storage array 120.

There is the host no and the storage array 120 in the storage system. The host 110 and the storage array 120 are connected. A user may read data from or write data to a LUN in the storage array by using the host 110. The LUN is a basic unit in which the storage array 120 provides a storage function for the host 110.

Figure 1B:
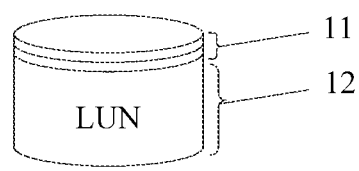
FIG. 1B is a schematic structural diagram of a LUN according to an example embodiment of the present invention.

As shown in FIG. 1B, data stored in each LUN is divided into metadata 11 and storage data 12. The metadata 11 is data used to manage and index the storage data, and the storage data 12 is directly stored data.

Figure 2:
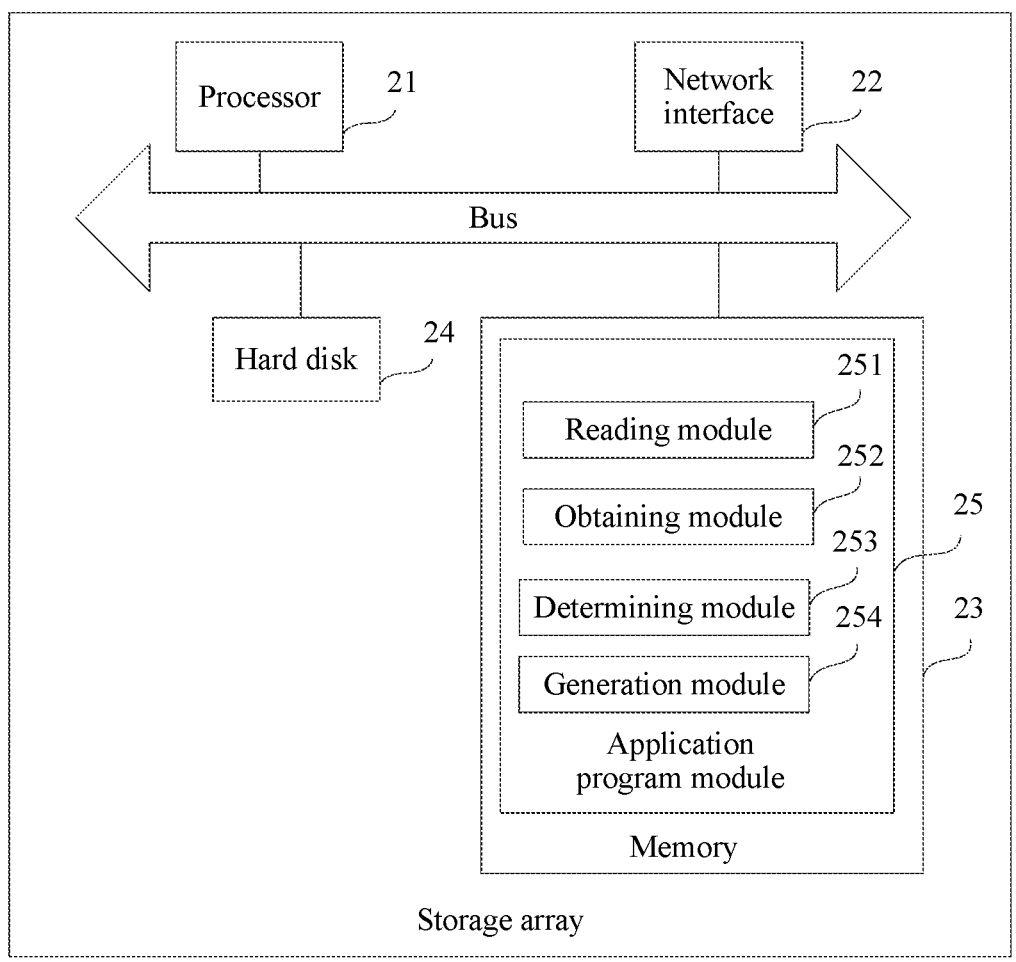
FIG. 2 is a schematic structural diagram of a storage array according to an example embodiment of the present invention.

Referring to FIG. 2, FIG. 2 is a schematic structural diagram of a storage array 120 according to an example embodiment of the present invention. The storage array 120 includes a processor 21, a network interface 22, a memory 23, and a hard disk 24.

The processor 21 includes one or more processing cores. The processor 21 performs various function applications and data processing by running a software program and a module.

There may be multiple network interfaces 22. Some of the network interfaces 22 are configured to communicate with a host.

The memory 23 is connected to the processor 21. For example, the memory 23 may be connected to the processor 21 using a bus. The memory 23 may be configured to store a software program and a module.

The memory 23 may store an application program module 25 required by at least one function. The application program module 25 may include a reading module 251, an obtaining module 252, a determining module 253, a generation module 254, and the like.

Figure 4A:
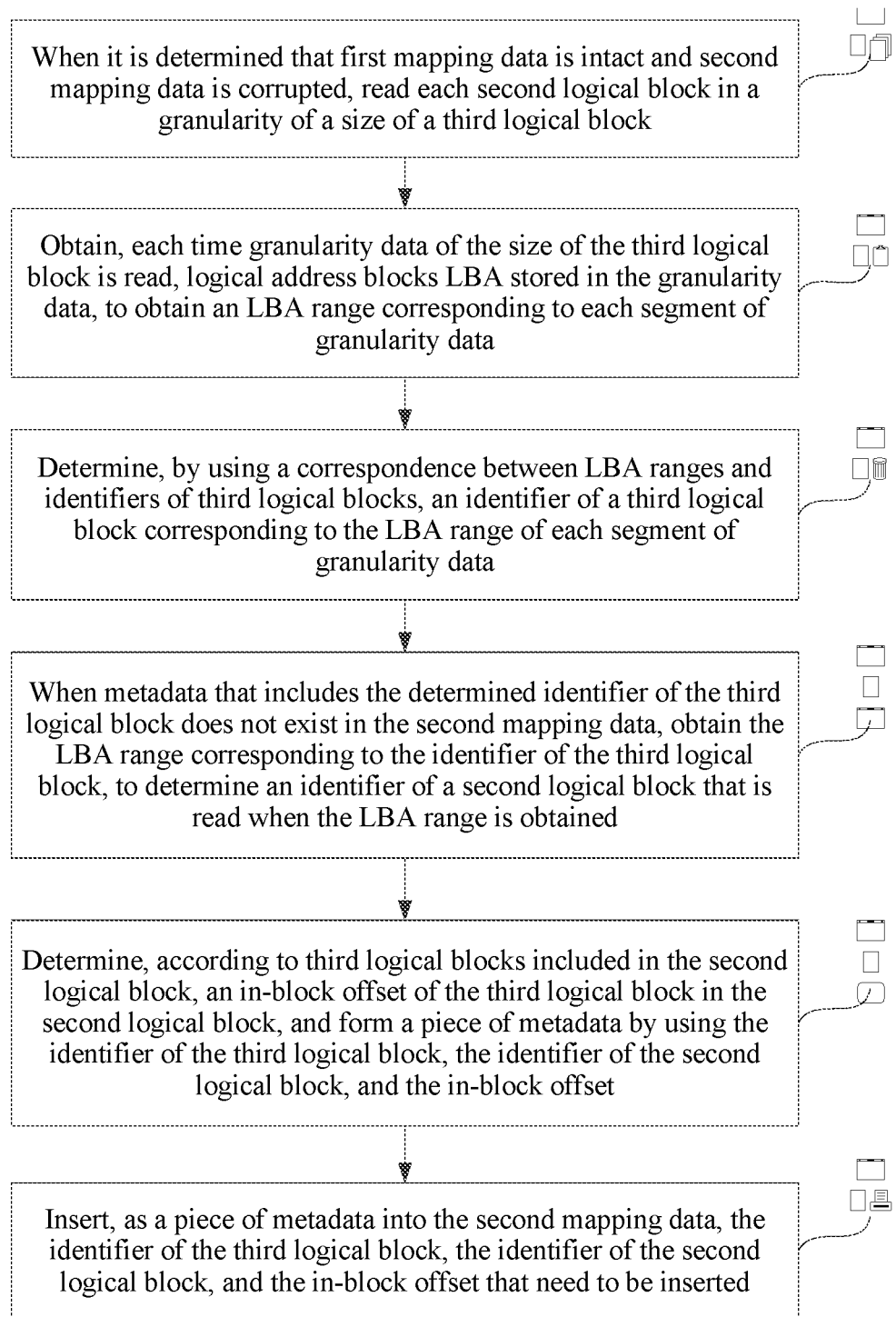
FIG. 4A is a flowchart of a metadata recovery method according to an example embodiment of the present invention.
Figure 4B:
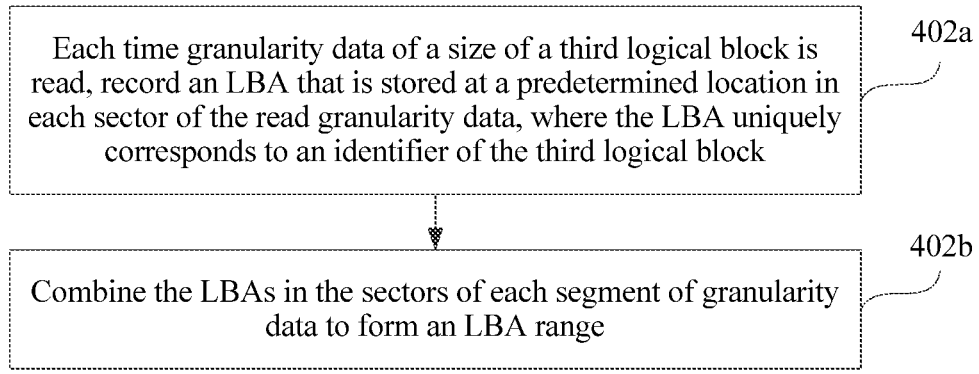
FIG. 4B is a flowchart of a method for reading an LBA range corresponding to a third logical block according to an example embodiment of the present invention.

The reading module 251, the obtaining module 252, the determining module 253, and the generation module 254 may perform corresponding steps in FIG. 4A and FIG. 4B. For details, refer to descriptions of FIG. 4A and FIG. 4B.

The memory 23 may be implemented by any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The hard disk 24 is configured to store data. The processor 21 saves read data to the hard disk 24, and saves corresponding metadata to the memory 23. When the processor 21 needs to read the data in the hard disk 24, the processor 21 may read the corresponding metadata from the memory 23, and read the corresponding data from a corresponding location in the hard disk 24 according to the metadata.

Figure 3A:
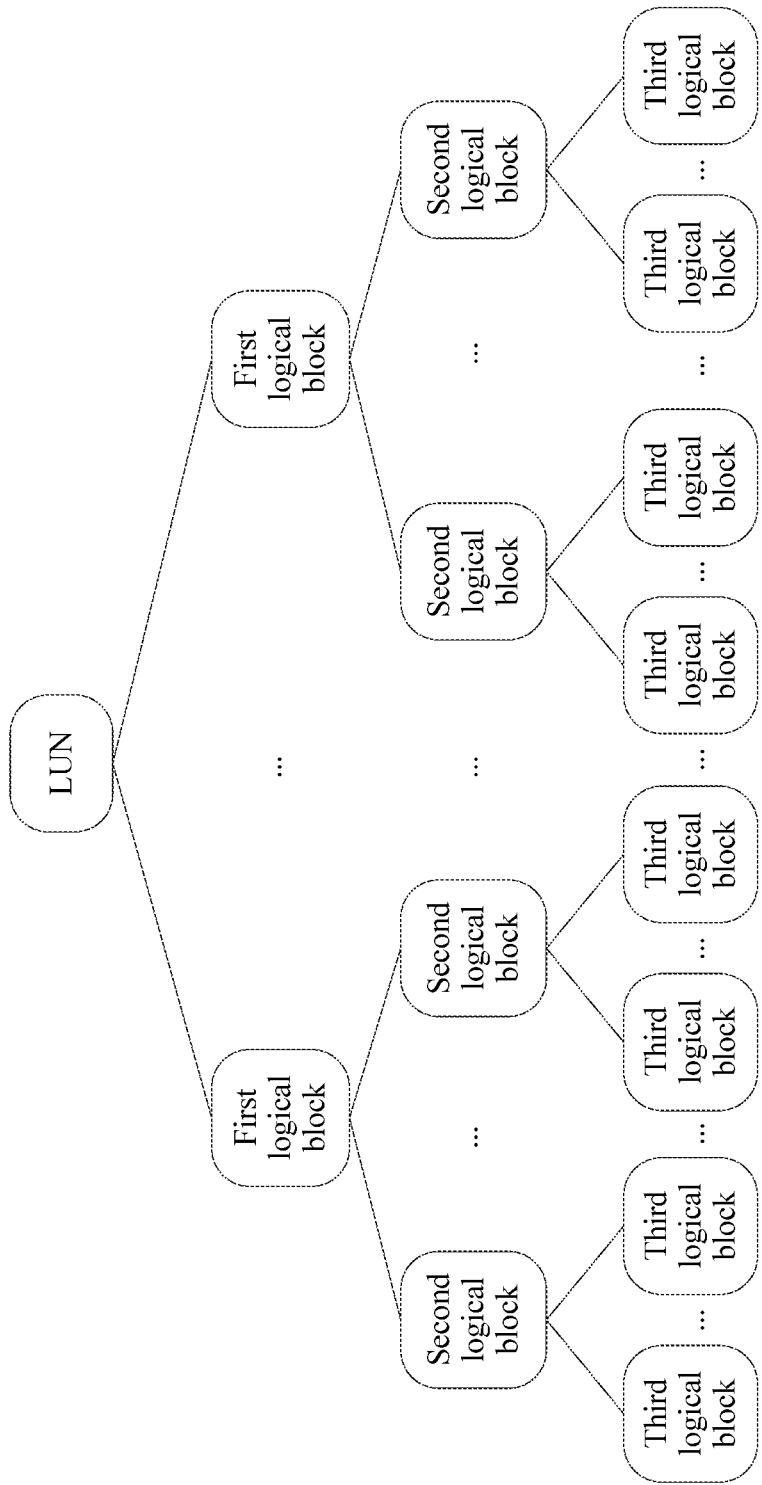
FIG. 3A is a schematic diagram of a logical structure a LUN according to an example embodiment of the present invention.
Figures 1, 3B:
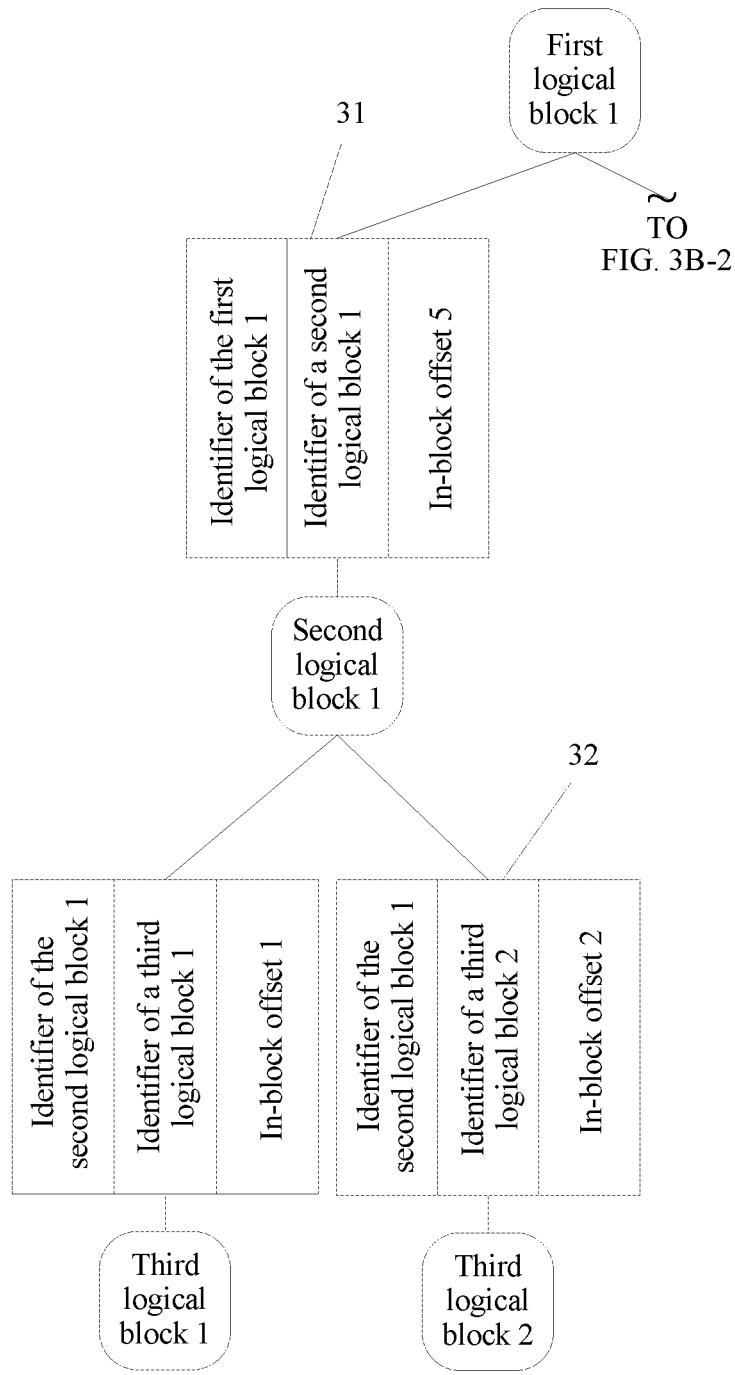
Figures 2, 3B:
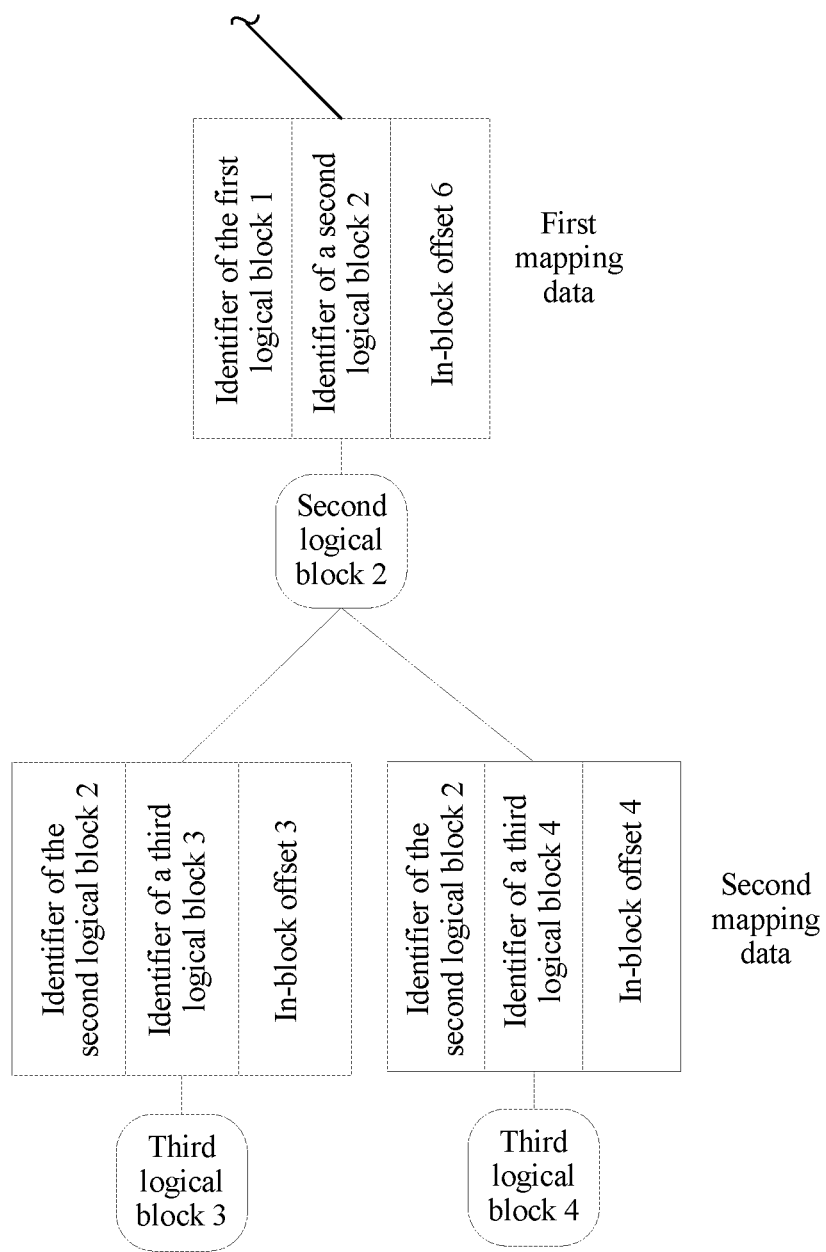

A person skilled in the art may understand that the structure of the storage array 120 shown in FIG. 1 does not limit the storage array 120. More or fewer pails than those shown in the figure may be included, some parts may be combined, or the pails may be arranged differently.

As shown in FIG. 3A, one LUN may include multiple first logical blocks, each first logical block includes multiple second logical blocks, and each second logical block includes multiple third logical blocks. Each third logical block needs 128 continuous sectors to store data. Sectors corresponding to different third logical blocks may be discontinuous.

After data is stored in the LUN, corresponding metadata, that is, an index of the storage data, is generated. It can be learned, according to a logical structure feature of the foregoing LUN, that mapping data of the LUN includes first mapping data and second mapping data. A mapping relationship between the first logical block and the multiple second logical blocks is the first mapping data, and a mapping relationship between the second logical block and the multiple third logical blocks is the second mapping data.

As shown in FIG. 3B-1 and FIG. 3B-2, a first logical block 1 in a LUN is divided into a second logical block 1 and a second logical block 2, the second logical block 1 is further divided into a third logical block 1 and a third logical block 2, and the second logical block 2 is further divided into a third logical block 3 and a third logical block 4. First mapping data is a mapping relationship between the first logical block 1 and each of the second logical block 1 and the second logical block 2. For example, metadata 31 in the first mapping data is the mapping relationship between the second logical block 1 and the first logical block 1. The metadata 31 includes three elements: an identifier of the first logical block 1, an identifier of the second logical block 1, and an in-block offset 5 of the second logical block 1 in the first logical block 1. Second mapping data is a mapping relationship between the second logical block 1 and each of the third logical block 1 and the third logical block 2, and a mapping relationship between the second logical block 2 and each of the third logical block 3 and the third logical block 4. For example, metadata 32 in the second mapping data is the mapping relationship between the third logical block 2 and the second logical block 1. The metadata 32 includes three elements: an identifier of the second logical block 1, an identifier of the third logical block 2, and an in-block offset 2 of the third logical block 2 in the second logical block 1.

Figure 3C:
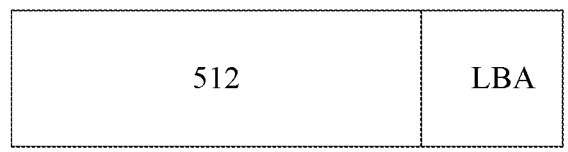
FIG. 3C is a schematic diagram of adding an LBA to a sector in a LUN according to an example embodiment of the present invention.

To recover corrupted metadata in the second mapping data as far as possible, in this embodiment, a logical block address (LBA) is added to a sector. That is, in addition to including 512 bytes used for storing data, each sector further includes bytes used for storing the LBA. As shown in FIG. 3C, first 512 bytes of the sector are used to store data, and bytes following the bytes are used to store the LBA. There is a different LBA at the rear of each sector. The LBA herein corresponds to an identifier of a third logical block corresponding to the sector. Optionally, the bytes in the sector that are used to store data are not limited to 512 bytes. The sectors need to have equal bytes for storing data, to facilitate reading of an LBA at a specified location in the sector.

It should be noted that each third logical block needs 128 consecutive sectors to store data, and values of LBAs stored in the sectors are different. Therefore, a range including LBAs in sectors of one third logical block uniquely corresponds to an identifier of the third logical block. For example, an LBA range corresponding to the third logical block 1 is [0, 127], and an LBA range corresponding to the third logical block 2 is [128, 255].

Figure 3D:
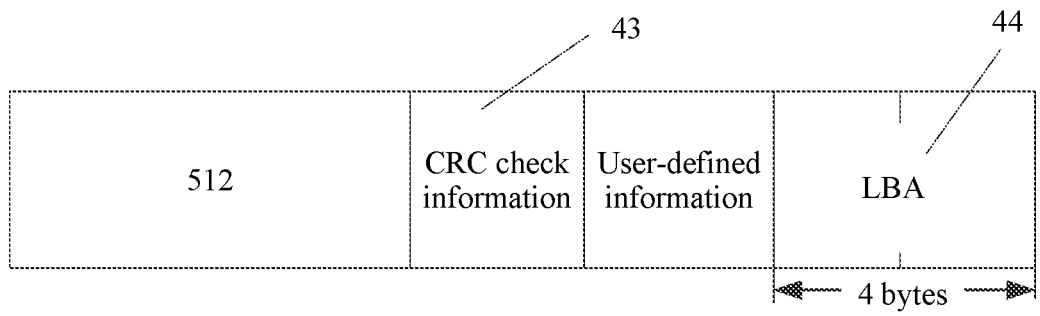
FIG. 3D is a schematic diagram of adding DIF data to a sector in a LUN according to an example embodiment of the present invention.

Optionally, in the sector, bytes used for storing check information and/or bytes used for storing user-defined information may be further set between the 512 bytes used for storing data and the bytes used for storing the LBA. For example, the first 512 bytes of the sector are used to store data, and space following the 512 bytes in the sector stores cyclic redundancy check ( ) information of data stored in the first 512 bytes, the user-defined information, and the LBA corresponding to the identifier of the third logical block. That is, as shown in FIG. 3D, additional check data is stored following the first 512 bytes of the sector. The additional check data is 8-byte data integrity field (DIF) data. The DIF data has 8 bytes in total. First two bytes 43 store the CRC check information of the stored data, and last four bytes 44 record the LBA. The LBA may be denoted as the LBA corresponding to the identifier of the third logical block. Remaining two bytes may be set according to a specific situation, and may be set as user-defined information, or may be set as array information. Optionally, bytes included in the DIF data may not be limited to 8 bytes, and the LBA, the CRC check information, and the like are not limited to be recorded in a sequence and a location in FIG. 3D.

In actual application, another storage array having a logical structure similar to that of the LUN may include a first logical block, a second logical block, . . . , and an $n^{th}$ logical block, and a value of n is greater than 3. An $i^{th}$ logical block in such a storage array includes multiple $(i+1)^{th}$ logical blocks, $i \geq 1$, and i<n. Correspondingly, mapping data in such a storage array includes n−1 groups of mapping data. Metadata in $i^{th}$ mapping data is a mapping relationship between the $i^{th}$ logical block and the $(i+1)^{th}$ logical block. A specific logical structure is shown in FIG. 3E.

Figure 3E:
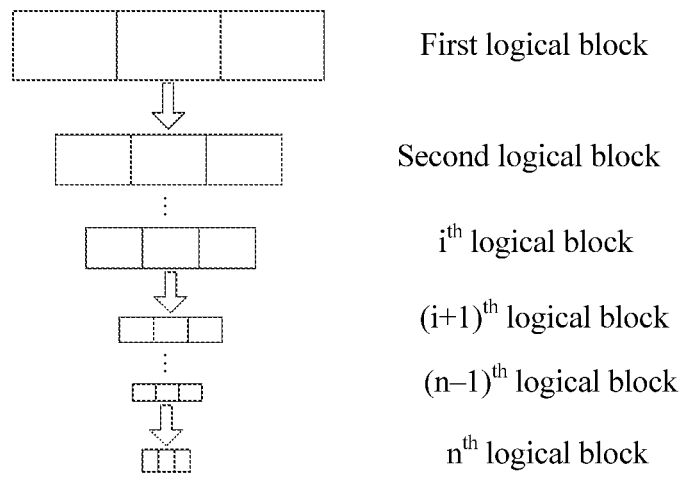
FIG. 3E is a schematic diagram of a logical structure of a storage array according to an example embodiment of the present invention.
Figure 3F:
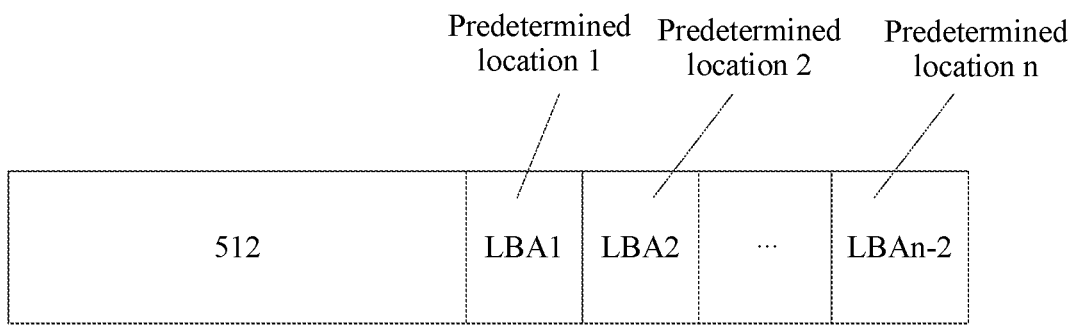
FIG. 3F is a schematic diagram of adding an LBA to a sector in a logical structure similar to a LUN according to an example embodiment of the present invention.

In order to recover mapping data in a storage array in FIG. 3E as far as possible, when the $i^{th}$ mapping data is recovered, and first mapping data to $(i-1)^{th}$ mapping data can be read successfully, a recovery method is the same as a recovery method for recovering metadata in the second mapping data in the LUN. In order to ensure that metadata in each type of mapping data is modified, an LBA corresponding to an identifier of each type of logical block needs to be recorded in a sector. As shown in FIG. 3F, first 512 bytes of the sector are used to store data, and bytes following the bytes are used to store LBAs respectively corresponding to a third logical block to an $n^{th}$ logical block. For example, an LBA1 at a predetermined location 1 corresponds to the third logical block, and an LBA2 at a predetermined location 2 corresponds to a fourth logical block.

A metadata recovery method shown in FIG. 4A is illustratively described using a LUN structure as an example with reference to FIG. 3A to FIG. 3F.

Referring to FIG. 4A, FIG. 4A is a flowchart of a metadata recovery method according to an example embodiment of the present invention. The processor 21 in the storage array 120 shown in FIG. 1 performs the following steps. The method includes the following several steps.

Step 401. When first mapping data is intact and second mapping data is corrupted, read each second logical block in a granularity of a size of a third logical block.

Referring still to FIG. 3B-1 and FIG. 3B-2, metadata in the LUN forms the first mapping data and the second mapping data. The first mapping data is a mapping relationship between a first logical block and the second logical block, and the second mapping data is a mapping relationship between the second logical block and the third logical block. When the first mapping data can be read successfully, but metadata in the second mapping data cannot be read successfully, the metadata in the second mapping data needs to be recovered. Data in each second logical block is read in the granularity of the size of the third logical block.

That is, a segment of data of a fixed size is first read from a read second logical block. After this segment of data is read, a segment of data of the fixed size is read again, and so on. The fixed size herein is the size of the third logical block.

Step 402. Obtain, each time granular data of the size of the third logical block is read, logical address blocks LBA stored in the granular data, to obtain an LBA range corresponding to each segment of granular data.

Optionally, this step may be implemented by using several sub-steps shown in FIG. 4B.

Step 402a. Each time the granular data of the size of the third logical block is read, record an LBA that is stored at a predetermined location in each sector of the read granular data, where the LBA uniquely corresponds to an identifier of the third logical block.

Step 402b. Combine the LBAs in the sectors of each segment of granular data to form the LBA range.

Each segment of granular data is stored in multiple sectors. Therefore, the storage array may read the LBA that uniquely corresponds to the identifier of the third logical block from the predetermined location in each sector. The LBAs stored in the sectors are combined to form the LBA range, that is, the LBAs in the sectors of each segment of granular data are combined to form the LBA range.

Step 403. Determine, using a correspondence between LBA ranges and identifiers of third logical blocks, an identifier of a third logical block corresponding to the LBA range of each segment of granular data.

Data is read in the granularity of the size of the third logical block. Therefore, granular data that is read each time corresponds to one third logical block. When the LBA range of each segment of granular data is obtained, the LBA range is an LBA range of a third logical block corresponding to the segment of granular data. Therefore, the identifier of the corresponding third logical block may be determined according to the LBA range of each segment of granular data.

In actual application, the identifier of the third logical block corresponds to one LBA range. Each time a third logical block is stored, a corresponding LBA is added to a corresponding sector in sequence. After data of the third logical block is stored, the LBA range including the LBA in the sector in which the third logical block is stored, and the LBA range corresponds to the third logical block. Therefore, the storage array may determine, using the correspondence between the LBA range and the identifier of the third logical block, the identifier that is of the third logical block and that corresponds to the LBA range of each segment of data.

For each determined identifier of the third logical block, it is detected whether metadata that includes the determined identifier of the third logical block exists in the second mapping data. If the metadata that includes the determined identifier of the third logical block does not exist in the second mapping data, metadata corresponding to the identifier of the third logical block needs to be generated, and step 404 is performed.

If the metadata that includes the determined identifier of the third logical block exists in the second mapping data, it is detected whether metadata that includes an identifier of a next third logical block exists in the second mapping data, that is, a next segment of data is processed, and step 402 is performed.

Step 404. When metadata that includes the determined identifier of the third logical block does not exist in the second mapping data, obtain the LBA range corresponding to the identifier of the third logical block, to determine an identifier of a second logical block that is read when the LBA range is obtained.

The LBA range is obtained by reading data in a second logical block. Therefore, the identifier of the second logical block that is read when the LBA range is obtained may be determined.

Step 405. Determine, according to third logical blocks included in the second logical block, an in-block offset of the third logical block in the second logical block, and form a piece of metadata by using the identifier of the third logical block, the identifier of the second logical block, and the in-block offset.

When the third logical block is a $p^{th}$ third logical block in the second logical block, 1 is added to a sum of intervals occupied by p−1 third logical blocks preceding the third logical block, to obtain the in-block offset of the third logical block in the second logical block, where p>0.

Step 406. Insert, as a piece of metadata into the second mapping data, the identifier of the third logical block, the identifier of the second logical block, and the in-block offset that need to be inserted.

In an insertion process, the metadata in the second mapping data is sorted according to identifier sizes of the third logical blocks. Therefore, the foregoing metadata may be inserted into the second mapping data according to an identifier size relationship between the third logical blocks.

It should be noted that when the first mapping data cannot be read successfully, metadata of all mapping data cannot be recovered. That is, when it is detected that the first mapping data cannot be read successfully, metadata recovery is directly exited.

In conclusion, the metadata recovery method provided in this embodiment of the present invention includes, when the first mapping data is intact and the second mapping data is corrupted, reading each second logical block in the granularity of the size of the third logical block; obtaining, each time the granular data of the size of the third logical block is read, logical address blocks (LBA) stored in the granular data, to obtain the LBA range corresponding to each segment of granular data; determining, using the correspondence between the LBA range and the identifier of the third logical block, the identifier that is of the third logical block and that is corresponding to the LBA range of each segment of granular data; and generating, when metadata that includes the determined identifier of the third logical block does not exist in the second mapping data, the metadata that includes the identifier of the third logical block. This resolves a technical problem in a current system that when metadata is corrupted, incompliant operations cannot be completely avoided by strengthening training of people and considerable communication costs are increased, and metadata recovery efficiency is improved.

Figure 5:
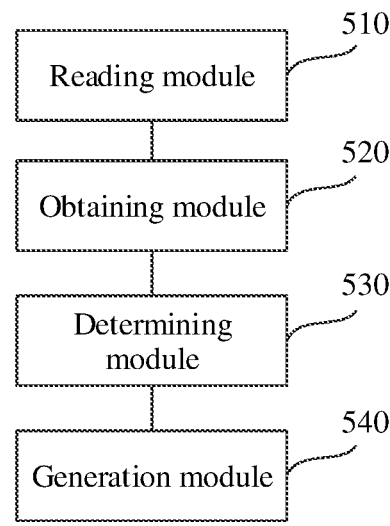
FIG. 5 is a block diagram of a metadata recovery apparatus according to an example embodiment of the present invention.

Referring to FIG. 5, FIG. 5 is a block diagram of a metadata recovery apparatus according to an embodiment of the present invention. The metadata recovery apparatus may be implemented as an entirety or a part of a storage array by using software, hardware, or a combination thereof. The metadata recovery apparatus may include a reading module 510, an obtaining module 520, a determining module 530, and a generation module 540.

The reading module 510 is configured to implement the foregoing step 401.

The obtaining module 520 is configured to implement the foregoing step 402.

The determining module 530 is configured to implement the foregoing step 403.

The generation module 540 is configured to implement a function of at least one of the foregoing steps 404, 405, and 406.

For related details, refer to the foregoing method embodiment.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely examples of embodiments of the present invention, but are not intended to limit the present invention. Any modification, equivalent replacement, and improvement made without departing from the spirit and principle of the present invention shall fall within the protection scope of the present invention.

What is claimed is:

1. A method, comprising:
   determining, by a storage device, that a first mapping data is intact but a second mapping data is corrupted, wherein the storage device includes a first logical block, the first logical block includes a plurality of second logical blocks, wherein each of the plurality of second logical blocks includes a plurality of third logical blocks, wherein a size of each second logical block of the plurality of second logical blocks is smaller than a size of the first logical block, a size of each third logical block of the plurality of third logical blocks corresponding to each of the plurality of second logical blocks is smaller than the size of each second logical block of the plurality of second logical blocks, and wherein the first mapping data records a mapping relationship between the first logical block and the plurality of second logical blocks, and the second mapping data records a plurality of mapping relationships between each of the plurality of second logical blocks and the respective plurality of third logical blocks corresponding to each of the plurality of second logical blocks;
   in response to determining that the first mapping data is intact but the second mapping data is corrupted, reading a plurality of portions of the plurality of second logical blocks, wherein each of the plurality of portions of the plurality of second logical blocks has the size of each of the plurality of third logical blocks, and wherein the reading of the plurality of portions of the plurality of second logical blocks obtains a plurality of logical address block (LBA) ranges, wherein a size of each LBA range of the plurality of LBA ranges is equivalent to the size of each third logical block of the plurality of third logical blocks corresponding to each of the plurality of second logical blocks;
   retrieving a plurality of first identifiers of at least a portion of the plurality of the third logical blocks corresponding to each of the plurality of second logical blocks based on a correspondence between the plurality of LBA ranges and the plurality of first identifiers;
   determining whether the first mapping data includes the retrieved plurality of first identifiers; and
   in response to determining that the first mapping data does not include the retrieved plurality of first identifiers, storing metadata comprising the retrieved plurality of first identifiers, to restore the second mapping data at least in part.

2. The method according to claim 1, further comprising:
   obtaining a plurality of second identifiers of the plurality of second logical blocks based on the plurality of LBA ranges;
   identifying an in-block offset of each of the plurality of third logical blocks in a respective second logical block of the plurality of second logical blocks according to the respective plurality of third logical blocks comprised in the respective second logical block; and
   forming a plurality of pieces of metadata, wherein each piece of metadata is formed using a respective first identifier of a respective third logical block, a respective second identifier of a respective second logical block, and a respective in-block offset.

3. The method according to claim 2, wherein identifying the in-block offset of each of the plurality of third logical blocks in the respective second logical block comprises:
   when the respective third logical block is a $p^{th}$ third logical block in the respective second logical block, adding 1 to a sum of intervals occupied by p−1 third logical blocks preceding the respective third logical block, to obtain the in-block offset of the respective third logical block in the respective second logical block, wherein p>0.

4. The method according to claim 1, wherein reading the plurality of portions of the plurality of second logical blocks, and obtaining the plurality of LBA ranges, comprises:
   recording a plurality of LBAs that are stored at a predetermined location in each sector of a plurality of sectors of the read plurality of portions, wherein each of the plurality of LBAs uniquely corresponds to the respective first identifier of the respective third logical block; and
   combining the plurality of LBAs in the plurality of sectors of each portion of read data to form the LBA range.

5. The method according to claim 1, wherein the metadata provides an index to data stored in the storage device.

6. The method according to claim 1, wherein each piece of metadata includes an identifier of a third logical block of the plurality of third logical blocks corresponding to each of the plurality of second logical blocks, an identifier of a second logical block of the plurality of second logical blocks, and an in-block offset.

7. A storage device, comprising:
   a non-transitory memory; and
   a processor;
   wherein the memory stores a first logical block, wherein the first logical block includes a plurality of second logical blocks, wherein each of the plurality of second logical blocks includes a plurality of third logical blocks, wherein a size of each second logical block of the plurality of second logical blocks is smaller than a size of the first logical block, and a size of each of the plurality of third logical blocks corresponding to each of the plurality of second logical blocks is smaller than the size of each of the plurality of second logical blocks;

wherein the processor is configured to:
determine that a first mapping data is intact but a second mapping data corrupted, wherein the first mapping data records a mapping relationship between the first logical block and the plurality of second logical blocks, wherein the second mapping data records a plurality of mapping relationships between each of the plurality of second logical blocks and the respective plurality of third logical blocks corresponding to the each of the plurality of second logical blocks;

in response to determining that the first mapping data is intact but the second mapping data corrupted, read a plurality of portions of the plurality of second logical blocks, wherein each of the plurality of portions of the plurality of second logical blocks has the size of each of the plurality of third logical blocks corresponding to each of the plurality of second logical blocks, and wherein the reading of the plurality of portions of the plurality of second logical blocks obtains a plurality of logical address block (LBA) ranges, wherein a size of each LBA range of the plurality of LBA ranges is equivalent to the size of each third logical block of the plurality of third logical blocks corresponding to each of the plurality of second logical blocks;

retrieve a plurality of first identifiers of at least a portion of the plurality of the third logical blocks corresponding to each of the plurality of second logical blocks based on a correspondence between the plurality of LBA ranges and the plurality of first identifiers;

determine whether the first mapping data includes the retrieved plurality of first identifiers; and in response to determining that the first mapping data includes the retrieved plurality of first identifiers, store metadata comprising the retrieved plurality of first identifiers, to restore the second mapping data at least in part.

8. The storage device according to claim 7, wherein the processor is further configured to:
obtain a plurality of second identifiers of the plurality of second logical blocks based on the plurality of LBA ranges;
identify an in-block offset of each of the plurality of third logical blocks in a respective second logical block of the plurality of second logical blocks according to the plurality of third logical blocks comprised in the respective second logical block of the plurality of second logical blocks; and
form a plurality of pieces of metadata using a respective identifier of the third logical block, a respective identifier of the second logical block, and a respective in-block offset.

9. The storage device according to claim 7, wherein the processor is configured to:
add 1 to a sum of intervals occupied by p−1 third logical blocks preceding the respective third logical block of the plurality of third logical blocks, to obtain the in-block offset of the respective third logical block in the respective second logical block, wherein p>0, and wherein the respective third logical block is a $p^{th}$ third logical block in the respective second logical block.

10. The storage device according to claim 7, wherein the processor is configured to:
record a plurality of LBAs that are stored at a predetermined location in each sector of a plurality of sectors of the read data, wherein each LBA uniquely corresponds to the respective identifier of the respective third logical block; and
combine the plurality of LBAs in the plurality of sectors of each portion of the plurality of portions to form a respective LBA range.

11. The storage device according to claim 7, wherein the metadata provides an index to data stored in the storage device.

12. The storage device according to claim 7, wherein each piece of metadata includes an identifier of a third logical block of the plurality of third logical blocks corresponding to each of the plurality of second logical blocks, an identifier of a second logical block of the plurality of second logical blocks, and an in-block offset.

13. A non-transitory memory comprising:
a first logical block, wherein the first logical block includes a plurality of second logical blocks, wherein each of the plurality of second logical blocks includes a plurality of third logical blocks, wherein a size of each second logical block of the plurality of second logical blocks is smaller than a size of the first logical block, and a size of each of the plurality of third logical blocks corresponding to each of the plurality of second logical blocks is smaller than the size of each of the plurality of second logical blocks; and an executable program including instructions, wherein the program includes instructions for:
determining that a first mapping data is intact but a second mapping data corrupted, wherein the first mapping data records a mapping relationship between the first logical block and the plurality of second logical blocks, wherein the second mapping data records a plurality of mapping relationships between each of the plurality of second logical blocks and the respective plurality of third logical blocks corresponding to the each of the plurality of second logical blocks;

in response to determining that the first mapping data is intact but the second mapping data corrupted, read a plurality of portions of the plurality of second logical blocks, wherein each of the plurality of portions of the plurality of second logical blocks has the size of each of the plurality of third logical blocks corresponding to each of the plurality of second logical blocks, and wherein the reading of the plurality of portions of the plurality of second logical blocks obtains a plurality of logical address block (LBA) ranges, wherein a size of each LBA range of the plurality of LBA ranges is equivalent to the size of each third logical block of the plurality of third logical blocks corresponding to each of the plurality of second logical blocks;

retrieve a plurality of first identifiers of at least a portion of the plurality of the third logical blocks corresponding to each of the plurality of second logical blocks based on a correspondence between the plurality of LBA ranges and the plurality of first identifiers;

determine whether the first mapping data includes the retrieved plurality of first identifiers; and in response to determining that the first mapping data includes the retrieved plurality of first identifiers, store metadata comprising the retrieved plurality of first identifiers, to restore the second mapping data at least in part.

14. The non-transitory memory according to claim 13, wherein the program further includes instructions for:
  obtaining a plurality of second identifiers of the plurality of second logical blocks based on the plurality of LBA ranges;
  identifying an in-block offset of each of the plurality of third logical blocks in a respective second logical block of the plurality of second logical blocks according to the plurality of third logical blocks comprised in the respective second logical block of the plurality of second logical blocks; and
  forming a plurality of pieces of metadata using a respective identifier of the third logical block, a respective identifier of the second logical block, and a respective in-block offset.

15. The non-transitory memory according to claim 13, wherein the program further includes instructions for:
  adding 1 to a sum of intervals occupied by p−1 third logical blocks preceding the respective third logical block of the plurality of third logical blocks, to obtain the in-block offset of the respective third logical block in the respective second logical block, wherein p>0, and wherein the respective third logical block is a $p^{th}$ third logical block in the respective second logical block.

16. The non-transitory memory according to claim 13, wherein the program further includes instructions for:
  recording a plurality of LBAs that are stored at a predetermined location in each sector of a plurality of sectors of the read data, wherein each LBA uniquely corresponds to the respective identifier of the respective third logical block; and
  combining the plurality of LBAs in the plurality of sectors of each portion of the plurality of portions to form a respective LBA range.

17. The non-transitory memory according to claim 13, wherein the metadata provides an index to data stored in the non-transitory memory.

18. The non-transitory memory according to claim 13, wherein each piece of metadata includes an identifier of a third logical block of the plurality of third logical blocks corresponding to each of the plurality of second logical blocks, an identifier of a second logical block of the plurality of second logical blocks, and an in-block offset.

* * * * *